US009880538B2

(12) United States Patent
Pai

(10) Patent No.: US 9,880,538 B2
(45) Date of Patent: Jan. 30, 2018

(54) ELECTRONIC DEVICE AND METHOD FOR LOADING PROGRAM CODE THEREOF

(71) Applicant: ASMedia Technology Inc., New Taipei (TW)

(72) Inventor: Chun-Te Pai, New Taipei (TW)

(73) Assignee: ASMEDIA TECHNOLOGY INC., New Taipei (TW)

( * ) Notice: Subject to any disclaimer, the term of this patent is extended or adjusted under 35 U.S.C. 154(b) by 516 days.

(21) Appl. No.: 14/561,195

(22) Filed: Dec. 4, 2014

(65) Prior Publication Data

US 2015/0168934 A1 Jun. 18, 2015

(30) Foreign Application Priority Data

Dec. 13, 2013 (TW) ............................ 102146139 A

(51) Int. Cl.
*G06F 9/00* (2006.01)
*G06F 15/177* (2006.01)
*G05B 19/042* (2006.01)
*G06F 9/24* (2006.01)

(52) U.S. Cl.
CPC ............ *G05B 19/0421* (2013.01); *G06F 9/00* (2013.01); *G06F 9/24* (2013.01)

(58) Field of Classification Search
CPC ............................ G06F 9/4401; G06F 9/4406
See application file for complete search history.

(56) References Cited

U.S. PATENT DOCUMENTS 7,447,846 B2 11/2008 Yeh
7,930,488 B2 4/2011 Yeh
2006/0069903 A1* 3/2006 Fischer .................. G06F 21/57 713/1
2006/0179302 A1* 8/2006 Hatakeyama .......... G06F 21/51 713/164
2006/0236125 A1* 10/2006 Sahita ................ G06F 12/1458 713/193
2007/0180223 A1* 8/2007 Tanaka ................. G06F 15/177 713/2
2009/0147945 A1* 6/2009 Doi ........................ H04L 9/002 380/2

(Continued)

FOREIGN PATENT DOCUMENTS

CN 101777038 A 7/2010
CN 102226895 B 5/2013
TW 200741462 A 11/2007

*Primary Examiner* — Phil Nguyen

(74) *Attorney, Agent, or Firm* — CKC & Partners Co., Ltd.

(57) ABSTRACT

An electronic device and a method for loading a program code thereof are disclosed herein. The electronic device includes a first controller, a second controller, a flash memory and a transmission interface. The flash memory is electrically connected to the first controller and stores a first program code corresponding to the first controller and a second program code corresponding to the second controller. The transmission interface is electrically connected between the first controller and the second controller. The first controller establishes a connection with the second controller via the transmission interface, and checks whether the second program code is valid. When the second program code is valid, the first controller loads the second program code to the second controller, so as to make the second controller execute the second program code.

8 Claims, 4 Drawing Sheets

100 flash memory storing unit storing unit
first controller storing unit storing unit
second controller

180

(56) References Cited

U.S. PATENT DOCUMENTS

| | | | | |
|---|---|---|---|---|
| 2009/0204751 | A1* | 8/2009 | Kushita | G06F 15/16 711/104 |
| 2012/0179899 | A1* | 7/2012 | Schardt | G06F 17/5054 713/2 |

* cited by examiner

ELECTRONIC DEVICE AND METHOD FOR LOADING PROGRAM CODE THEREOF

CROSS-REFERENCE TO RELATED APPLICATION

This application claims the priority benefit of Taiwan application serial No. 102146139, filed on Dec. 13, 2013. The entirety of the above-mentioned patent application is hereby incorporated by reference herein and made a part of specification.

BACKGROUND OF THE INVENTION

Field of the Invention

The disclosure relates to an electronic device and, more particularly, to an electronic device with a flash memory to serve as multiple controllers.

Description of the Related Art

Conventional electronic devices equip with multiple controllers to form a control system to operate a large number of calculations. Multiple controllers and processors may consist varies chips with different functions.

Conventionally, in a control system with multiple controllers, each of the controllers needs a corresponding flash memory to store data and firmware. However, as the number of the controllers and the flash memories used by the electronic device increases, the occupied space of an electronic device becomes larger, and also increases the hardware cost.

BRIEF SUMMARY OF THE INVENTION

An electronic device includes a first controller, a second controller, a flash memory and a transmission interface. The flash memory is electrically connected to the first controller and stores a first program code corresponding to the first controller and a second program code corresponding to the second controller. The transmission interface is electrically connected between the first controller and the second controller. The first controller establishes a connection with the second controller via the transmission interface, and checks whether the second program code is valid. When the second program code is valid, the first controller loads the second program code to the second controller to make the second controller execute the second program code.

A method for loading a program code is applied to an electronic device. The electronic device includes a first controller, a second controller, a transmission interface connected between the first controller and the second controller, and a flash memory storing a first program code and a second program code. The method for loading a program code includes following steps: executing a first booting program and loading a first program code by the first controller; executing the first program code by the first controller; checking whether the second program code is valid by the first controller; sending a write request to the second controller by the first controller to load the second program code to the second controller and make the second controller execute the second program code when the second program code is valid.

In sum, the electronic device can update firmware of multiple controllers via a common flash memory. Consequently, the circuit size and hardware cost of the electronic device with multiple controllers can be reduced.

These and other features, aspects and advantages of the present disclosure will become better understood with regard to the following description, appended claims, and accompanying drawings.

DETAILED DESCRIPTION OF THE EMBODIMENTS

An electronic device and a method for loading a program code are illustrated with relating figures.

Figure 1:
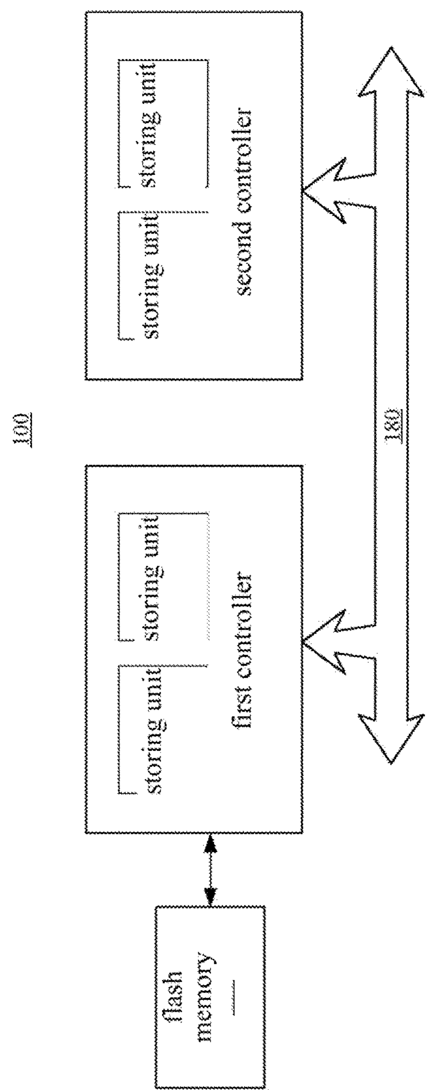
FIG. 1 is a schematic diagram showing an electronic device in an embodiment.

FIG. 1 is a schematic diagram showing an electronic device 100 in an embodiment. The electronic device 100 may be a personal computer, a smart phone, a tablet computer or a smart television, which is not limited herein. As shown in FIG. 1, the electronic device 100 includes a first controller 120, a second controller 140, a flash memory 160 and a transmission interface 180. The flash memory 160 is electrically connected to the first controller 120. The transmission interface 180 is electrically connected between the first controller 120 and the second controller 140.

As shown in FIG. 1, the first controller 120 includes a storing unit 122 and a storing unit 124. The second controller 140 includes a storing unit 142 and a storing unit 144. In detail, the storing unit 122 and the storing unit 142 may be a program read only memory (ROM). The storing unit 122 stores a booting program of the first controller 120, and the storing unit 142 stores a booting program of the second controller 140. The booting program can execute a boot loader of firmware, and establish a connection with other sub controllers such as the second controller 140) and generate a control command.

In an embodiment, the storing unit 124 and the storing unit 144 may be a program random access memory (RAM). The storing unit 124 loads the firmware of the first controller 120 (which is a program code CODE1) from the flash memory 160, and the storing unit 144 loads the firmware of the second controller 140 (which is a program code CODE2) from the flash memory 160.

In the embodiment, the first controller 20 and the second controller 140 may be chips of all kinds of types or functions, which is not limited herein. The transmission interface 180 includes a serial peripheral interface bus, a network and a serial advanced technology attachment (SATA) interface.

Figure 2:
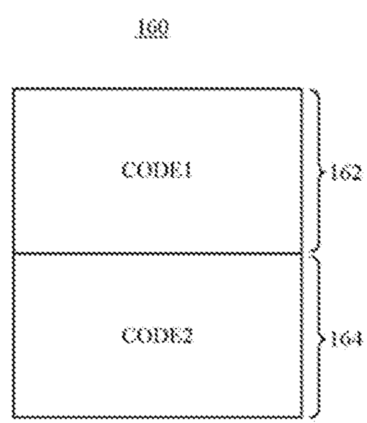
FIG. 2 is a schematic diagram showing a configuration of a flash memory in FIG. 1.

FIG. 2 is a schematic diagram showing a configuration of the flash memory 160 in FIG. 1. Please refer to FIG. 1 and FIG. 2, as shown in FIG. 2, the flash memory 160 includes a data block 162 and a data block 164. The data block 162 stores the program code CODE1 corresponding to the first controller 120. The data block 164 stores the program code CODE2 corresponding to the second controller 140. For example, the program code CODE1 may be the firmware of the first controller 120, the program code CODE2 may be the firmware of the second controller 140, and the program code CODE1 and the program code CODE2 can be stored in the flash memory 160 in the format of RAM code.

In the embodiment, the first controller 120 establishes a connection with the second controller 140 via the transmission interface 180, and loads the program code CODE2 to the storing unit 144 of the second controller 140 via the flash memory 160 to update the firmware of the second controller 140.

As stated above, the firmware of the second controller 140 can be updated via the first controller 120, which do not need an additional flash memory.

Figure 3:
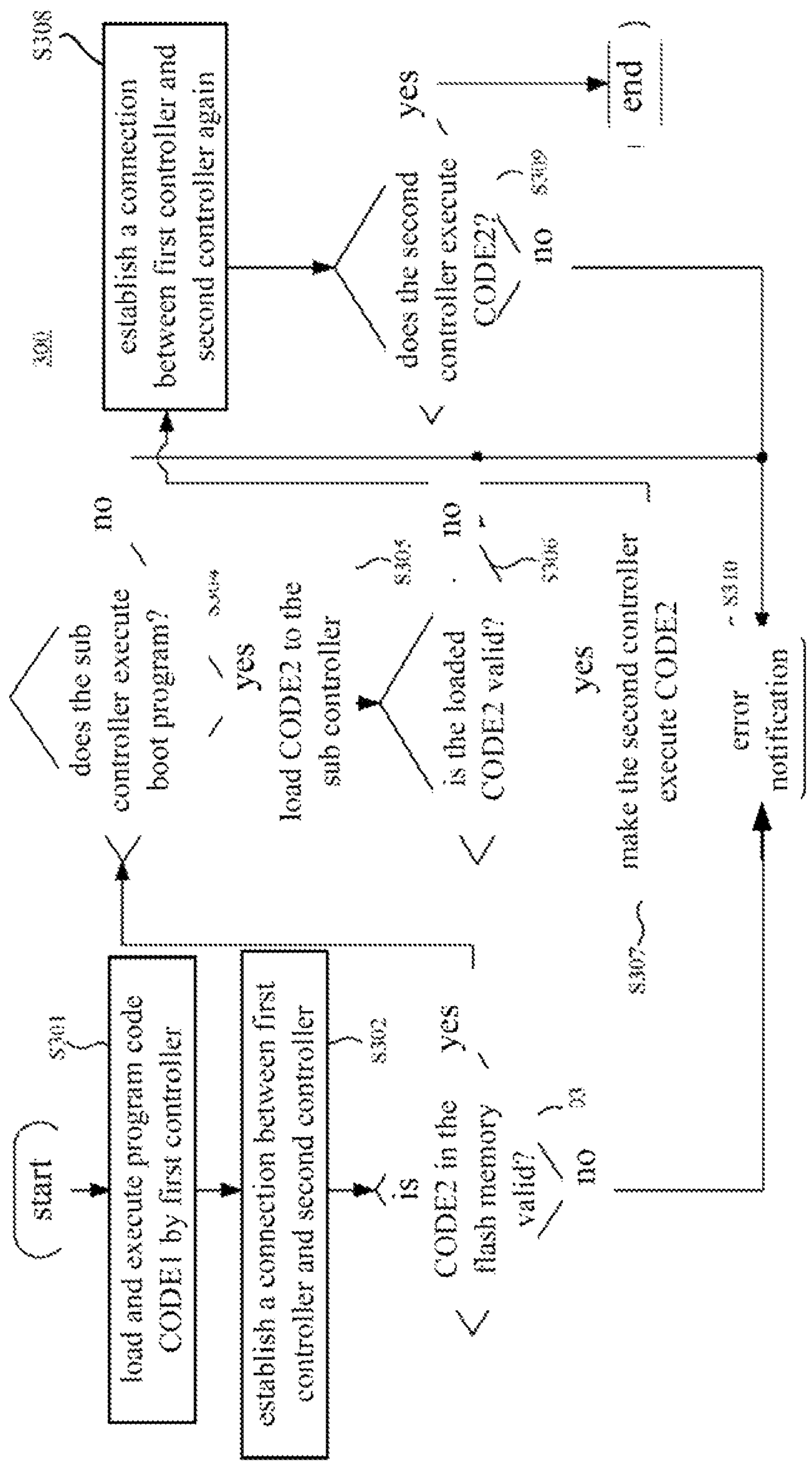
FIG. 3 is a flow chart showing a method for loading a program code in an embodiment.

FIG. 3 is a flow chart showing a method 300 for loading a program code in an embodiment. The method 300 for loading a program code can be applied to the electronic device 100 in FIG. 1. Please refer to FIG. 1 to FIG. 3, the operation of the electronic device 100 in FIG. 1 and the method 300 are illustrated together. Moreover, two controllers are taken as an example to illustrate the electronic device 100 and the method 300 as follows, which is not limited herein.

In step S301, when the electronic device 100 is reset and is booted, the first controller 120 executes the booting program in the storing unit 122, and the second controller 140 executes the booting program in the storing unit 142. Then, the first controller 120 loads the program code CODE1 (which is the firmware of the first controller 120) to the storing unit 124 via the flash memory 160 and executes the program code CODE1.

In step S302, the first controller 120 sends a connecting request to the second controller 140 via the transmission interface 180 to establish a connection with the second controller 140.

In step S303, the first controller 120 reads the program code CODE2 (which is the firmware of the second controller 140) in the flash memory 160, and checks whether the program code CODE2 is valid, which means that whether the program code CODE2 can be correctly executed by the second controller 140 is checked. If the program code CODE2 in the flash memory 160 is valid, step S304 is executed. On the contrary, if the program code CODE2 is invalid, step S310 is executed.

In detail, in the step S303, the first controller 120 can check the program code CODE2 via a checking mechanism, such as cyclic redundancy check (CRC), firmware signature or checksum. In the embodiment, the checking mechanism can be achieved via software or hardware. For example, if designing flexibility is first taken into account, the checking mechanism can be achieved via software, such as preprogramming it in the program code CODE1. If the execution speed and precision are first taken into account, the checking mechanism can be achieved via hardware, such as a check circuit 126 shown in FIG. 4.

Figure 4:
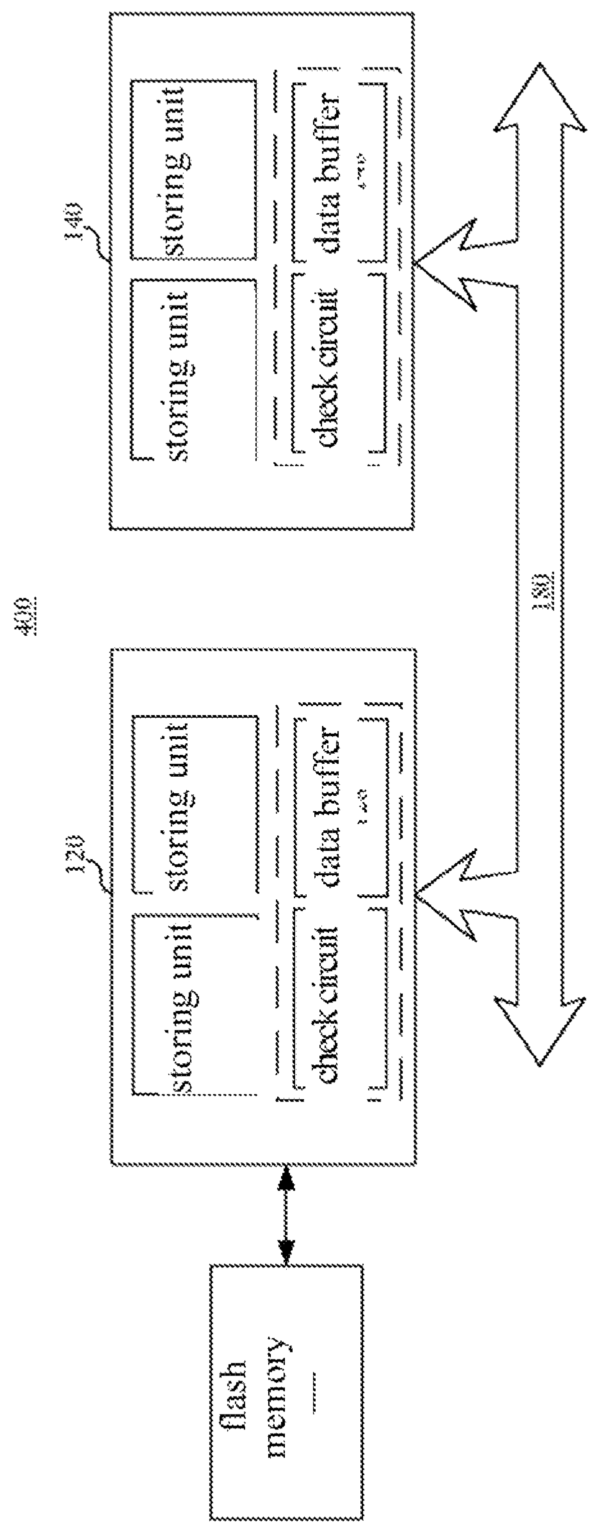
FIG. 4 is a schematic diagram showing an electronic device in another embodiment.

FIG. 4 is a schematic diagram showing an electronic device 400 in another embodiment. Compared with the electronic device 100, the controller 120 of the electronic device 400 further includes a check circuit 126 and a data buffer 128. The check circuit 126 may include a calculating processor or a combination of circuits to execute the calculation of the checking algorithm. The data buffer 128 may receive the program code CODE2 from the check circuit 126 and transmit it to the second controller 140 via the transmission interface 180.

For example, taking the data capacity of the data buffer 128 into account, the first controller 120 can transmit the program code CODE2 to the check circuit 126 in segments. The check circuit 126 checks whether the program code CODE2 is valid via CRC or checksum. If the program code CODE2 is valid, the check circuit 126 transmits the program code CODE2 to the data buffer 128 in segments, and the data buffer 128 transmits the program code CODE2 to the second controller 140 in segments.

Please refer to FIG. 1 to FIG. 3, in step 304, the first controller 120 sends a state confirming request to the second controller 140 to confirm whether the second controller 140 executes the booting program in the storing unit 142 normally. After the second controller 140 receives the state confirming request, it sends back an operation state to the first controller 120 to confirm whether the second controller 140 executes the booting program in the storing unit 142 normally. If it is confirmed that the second controller 140 executes the booting program in the storing unit 142 normally, step S305 is executed. On the contrary, the step S310 is executed.

In the step S305, the first controller 120 confirms that the second controller 140 executes the booting program in the storing unit 142, and the first controller 120 sends a write request to the second controller 140 to load the program code CODE2 in the flash memory 160 to the storing unit 144 of the second controller 140.

Via the step S304, the first controller 120 can confirm whether the second controller 140 is executing the booting program first and determine whether to load the program code CODE2 to the storing unit 144 (the step S305). Thus, it can be avoided that when the second controller 140 is executing the original program code in the storing unit 144, the first controller 120 loads the program code CODE2 to the storing unit 144. If the first controller 120 writes the program code CODE2 to the storing unit 144 when the second controller 140 is executing the original program in the storing unit 144, an error may occur in the original program in the storing unit 144, and the second controller 140 may operate abnormally.

In the step S306, the second controller 140 checks the program code CODE2 again to confirm whether the program code CODE2 is valid, and whether an error or a miss occurs in the transmission of the program code CODE2.

The second controller 140 can also use the checking mechanism stated in the previous embodiment, and the checking mechanism may also be achieved via software or hardware. Taking software as an example, the checking mechanism may be predesigned in the booting program in the storing unit 142.

Taking hardware as an example, as shown in FIG. 4, the second controller 140 of the electronic device 400 may further includes a check circuit 146 and a data buffer 148. The structure of the check circuit 146 may be the same as that of the check circuit 126, which is not limited herein. For example, the data buffer 148 can receive the program code CODE2 from the flash memory 160 in segments, and transmit it to the check circuit 146 in segments. The check circuit 146 receives the program code CODE2 in segments and checks one by one. When the program code CODE2 is valid, the check circuit 146 transmits the program code CODE2 to the storing unit 144.

Please refer to FIG. 1 to FIG. 3 again, in the step S307, when the second controller 140 confirms the program code CODE2 is valid, the first controller 120 sends a reset request to the second controller 140 to reboot the second controller 140, and the second controller 140 starts executing the program code CODE2 in the storing unit 144.

In step S308, the second controller 140 gives a reply to the first controller 120 that the reset is finished, and the first controller 120 establishes a connection with the second controller 140 again.

In step S309, the first controller 120 sends a state confirming request to the second controller 140 to confirm whether the second controller 140 is executing the program code CODE2 in the storing unit 144. If the second controller 140 executes the program code CODE2 correctly, it means that the second controller 140 loads the program code CODE2 successfully. On the contrary, if the connection is time out or the second controller 140 does not execute the program code CODE2 correctly, it means that an error occurs in the loading of the program code CODE2, and the step S310 is executed.

In the step S310, the first controller 120 generates an error notification according to the step S303, S304 or S309 to inform the user to reset the electronic device 100 again or check it.

Although the present disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. An electronic device, comprising:

a first controller;

a second controller;

a flash memory electrically connected to the first controller and storing a first program code corresponding to the first controller and a second program code corresponding to the second controller, wherein the first program code and the second program code are different and separate from each other; and a transmission interface electrically connected between the first controller and the second controller;

wherein the first controller communicates with the second controller via the transmission interface, and checks whether the second program code is valid, and when the second program code is valid, the first controller loads the second program code to the second controller to make the second controller execute the second program code wherein the second controller further includes: a second data buffer receiving the second program code from the first controller; and a second check circuit checking whether the second program code received by the second data buffer is valid, and transmitting the second program code to the second data buffer.

2. The electronic device according to claim 1, wherein the first controller includes: a first storing unit storing a first booting program; and a second storing unit, when the electronic device is booted, the first controller executes the first booting program and loads the first program code to the second storing unit.

3. The electronic device according to claim 1, wherein the second controller includes a third storing unit storing a second booting program, and when the electronic device is booted, the second controller executes the second booting program.

4. The electronic device according to claim 3, wherein the second controller further includes a fourth storing unit, and when the second controller executes the second booting program, the first controller sends a write request to the second controller and loads the second program code to the fourth storing unit.

5. The electronic device according to claim 1, wherein the first controller further includes: a first check circuit checking whether the second program code is valid; and a first data buffer receiving the second program code from the flash memory and transmitting the second program code to the second controller.

6. A method for loading a program code applied to an electronic device, wherein the electronic device includes a first controller, a second controller, a transmission interface and a flash memory, the transmission interface is connected between the first controller and the second controller, and the flash memory stores a first program code and a second program code, wherein the first program code and the second program code are different and separate from each other, the method comprising following steps:

executing a first booting program and loading the first program code by the first controller;

executing the first program code by the first controller; and checking whether the second program code is valid by the first controller, wherein when the second program code is valid, the first controller sends a write request to the second controller to load the second program code to the second controller wherein the method further includes: checking whether the loaded second program code is valid by the second controller, wherein when the second program code is valid, the first controller sends a reset request to the second controller to make the second controller execute the second program code.

7. The method for loading a program code according to claim 6, wherein the method further includes: confirming whether the second controller executes a second booting program by the first controller, wherein when the second controller executes the second booting program, the first controller sends the write request to the second controller.

8. The method for loading a program code according to claim 6, wherein the method further includes:

establishing a connection between the first controller and the second controller via the transmission interface, wherein the first controller sends a state confirming request to the second controller to check whether the second controller executes the second program code.

* * * * *